April 22, 1958

J. J. KASPER 2,831,532

LAMINATED CUSHION

Filed July 15, 1953

INVENTOR:
JOHN J. KASPER
BY

ATT'Y

April 22, 1958 J. J. KASPER 2,831,532
LAMINATED CUSHION
Filed July 15, 1953 2 Sheets-Sheet 2
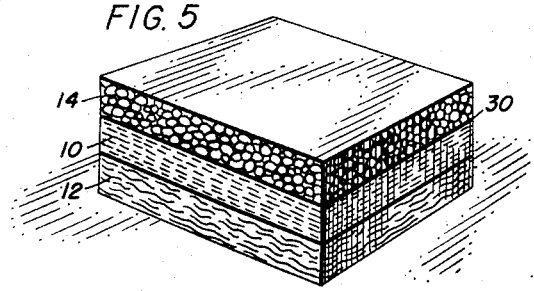
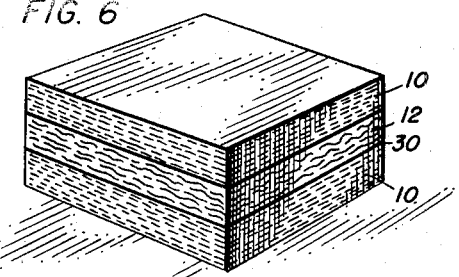
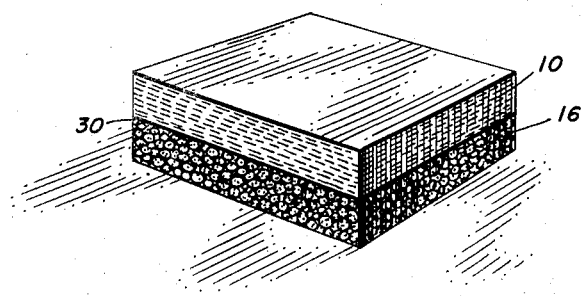
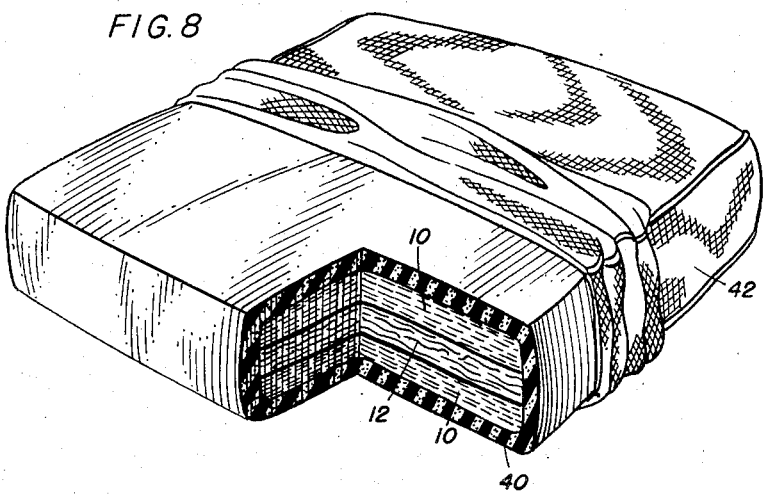
INVENTOR:
JOHN J. KASPER
BY
ATT'Y

United States Patent Office 2,831,532
Patented Apr. 22, 1958

2,831,532

LAMINATED CUSHION

John J. Kasper, Chicago, Ill., assignor to Illinois Fibre Specialty Co., Inc., Chicago, Ill., a corporation of Illinois Application July 15, 1953, Serial No. 368,139

1 Claim. (Cl. 155—182)

This invention relates in general to a cushion made of a plurality of layers which are bonded together and cut to size or various sizes for use in upholstered furniture, cushions, seats for mattresses, davenports, and automobiles, and in any place where a resilient cushion can be used.

It is the present practice to provide a padding made of cotton, hair, or other material usually disposed in a sheet or layer which is covered by a fabric to enclose the cushioning material and often a spring or springs are combined with the cushion to give it sufficient resilience.

The present invention is for an entirely different material which comprises a laminated product having sheets or layers of different resilient materials which are bonded together and in which the resilience of one material or layer is added to that of the other layers with a cumulative effect which enhances the resilient effects of the separate materials.

An important object of the invention is to provide a laminated cushion filler in which the layers are bonded together so that they will not slip or become displaced during shipment or use.

A further object of the invention is to provide an improved method of combining separate layers of resilient material and bonding them together.

A further object of the invention is to provide a method of producing a laminated filler for cushions and the like, in which separate layers are bonded together and the layers thus bonded are cut to size so that the sized and laminated forms may be handled, stored, shipped and applied in the manner for which they are intended without disrupting the layers and by keeping them intact in their cut form.

A further object of the invention is to provide a laminated filler for cushions of various kinds in which different layers of resilient material are combined in various ways to produce results depending upon the use or utility of the cushion material.

Still a further object of the invention is to combine laminated fibrous material of various consistencies to produce different resilient results, the resilience of some fibers reacting against those of other layers for producing cumulative and other resilient effects.

A still further object of the invention is to produce a cushion filler comprising a plurality of layers of resilient fibrous materials bonded together in sheets and cut to size for producing compressible fillers for pillows, seats, mattresses, and the like.

Other objects of the invention will appear in the specification and will be more apparent from the accompanying drawings in which, Fig. 1 is a diagrammatic representation of a method of making a laminated cushion and bonding the separate layers together in accordance with this invention.

Fig. 5 is a fragmentary perspective view of a filler composed of foam rubber, glass fiber and tuflex.

Fig. 6 is a fragmentary perspective view of a filler composed of three layers, the center layer of tuflex and the outside layers of glass fiber.

Fig. 7 is a perspective view of a fragmentary filler composed of glass fiber and granulated sponge rubber; and Fig. 8 is a fragmentary view of a pillow including laminated layers of glass fiber, tuflex and glass fiber completely enclosed in a cover of sponge rubber with an outside fabric cushion cover.

Figure 1:
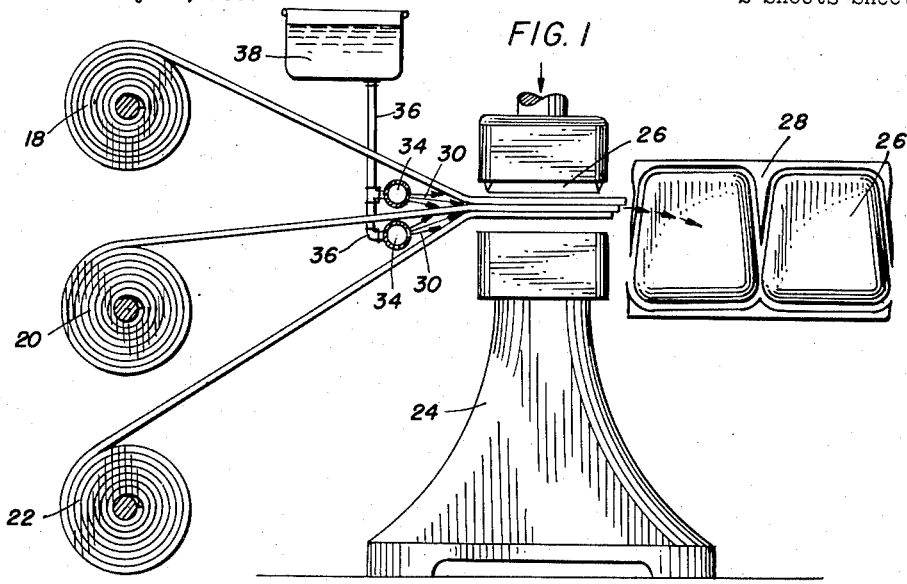

In producing a cushion material for upholstery, cushion, stuffing, mattress, and other purposes, it is customary either to cover a plurality of small springs with a layer of padding or to enclose connected springs in such a layer and then to apply a cushion cover thereto.

Another current method of producing cushions is to make them entirely of foam or sponge rubber. Other materials such as hair, down, cotton felt, and other similar materials are commonly used as fillers for cushions and upholstery. One objection to cushions of this kind is that after the natural resilience of the material has worn off, the cushions become set or soggy and do not return easily to their original or buoyant form and frequently the cover of cotton, hair, or the like, is worn upon the springs or the springs protrude through the padding and perforate the cover of the cushion or become similarly objectionable. This may be due in part to the fact that the materials are not held in proper relation with respect to each other, and portions of the material slip or become displaced with respect to the other and tend to destroy the appearance and also the resiliency of the cushion or other article to which the padding is attached.

The present invention overcomes these objections by utilizing known fibers of glass, cotton, and other materials by securing them together in a new way for retaining the layers in position and cutting all of the layers simultaneously to provide a pre-cut cushion containing all of the laminations which are permanently joined for keeping them in the same relative position.

Referring now more particularly to the drawings, the fibers commonly employed are glass fiber 10, an extremely light, soft and resilient layer of material obtained from glass and varying in thickness from ¼" to 1½ or 2"; a cotton base material 12 known as tuflex which is a loose-felted but coherent mass of cotton material somewhat resembling cotton batten but having more adherence and also varying in thickness from ½" to 1" or more; foam rubber 14, a light fluffy mixture of rubber varying in thickness from ½" to 1½" or more; a granulated sponge rubber 16 comprising chopped-up pieces of sponge rubber secured together in a layer of rubber and having a resilient nature but less resilient than sponge rubber.

The above mentioned layers are sufficient for carrying out the method of making cushion fillings but other layers of material such as Celotex, jute, hair, cardboard, paper, and the like, may also be combined with glass fiber, tuflex, and sponge rubber layers to produce similar but somewhat varying effects.

These layers are supplied in rolls 18, 20 and 22 mounted on spindles and adapting the layers to be fed together to a machine 24 having a movable cutter 26 such that when the layers of material are fed together through the machine and the cutter is operated, it will produce cut pads 26 of laminations of the different materials leaving a marginal residue 28.

While the padding material is fed to the machine 24, an adhesive 30 such as rubber cement or silicate resin base is applied between adjacent sheets by means of nozzles 34 connected by pipes 36 to a tank 38 from which the adhesive is supplied. With this operation, the cushion layers are bonded together by the adhesive when they reach the cutting machine 24 and the operation of the cutter 26 cuts all layers to the same size and the cut cushions 26 retain their shape after being cut so that they can be handled, stored, shipped and actually placed in position where they are to be used without disrupting the connection or breaking the bond between the layers.

Figure 2:
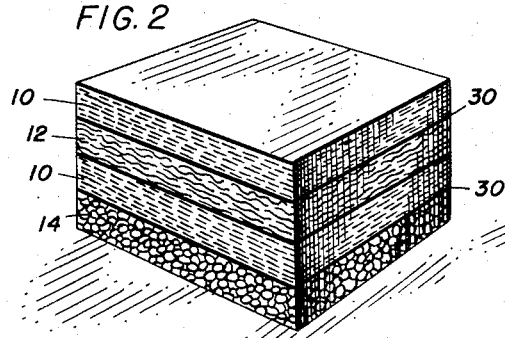
Fig. 2 is a perspective view of a fragment of a filler having four layers of material.

In the operation of this system where a big cushion is desired, two layers of glass fiber 10, a layer of tuflex 12 and a layer of foam rubber, as shown in Fig. 2, may be combined with the tuflex between the two layers of glass fiber and the foam rubber at the outside of one of the glass fiber layers. In making a large cushion, thicker layers of material are bonded together and the layers combined to provide a thick resilient cushion filler.

Figure 3:
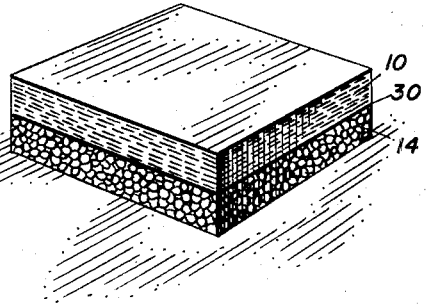
Fig. 3 is a perspective view of a fragment of a filler combining glass fiber and foam rubber.
Figure 4:
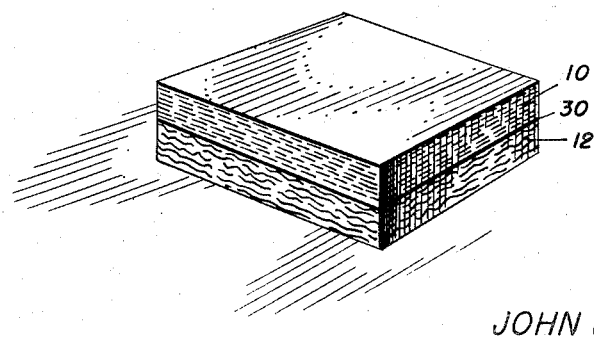
Fig. 4 is a fragmentary perspective view of a filler composed of glass fiber and tuflex.

For furniture and bedding, it may not be desired to have such a thick filler and the combination, shown in Fig. 3, consisting of a layer of glass fiber 10 and a layer of foam or sponge rubber 14 may be bonded together to produce the desired filling. This filling may be particularly adapted for use in furniture and bedding where a thin layer is desired, and a correspondingly thin lamination glass fiber and of foam rubber may be bonded together for the purpose desired. If a somewhat stiffer padding is desired, the glass fiber layer 10 may be combined with a tuflex layer 12, as shown in Fig. 4, the layers being bonded together by an adhesive 30, the tuflex being somewhat stiffer than the glass fiber but forming a backing against which the glass fiber has a more or less resilient action. This combination is suited for furniture, caskets, and has a wide application to furniture of many different kinds.

In the combination of layers, shown in Fig. 5, a foam rubber layer is at one side, a tuflex layer is at the other side and a glass fiber layer is between them. These layers are all bonded together by adhesive layers 30 and since the material has a tuflex base, an intermediate glass fiber resilient layer, and an outer layer of foam rubber, it is extremely soft, and pleasing combination which is also used for furniture, bedding, caskets, and the like.

A light flexible filler material is shown by Fig. 6, which is sometimes known as feather-flex comprising outer layers of glass fiber 10, and an intermediate layer of tuflex 12 bonded together by adhesive layers 30. This material has a common use for furniture upholstering.

Another soft cushion combination is shown in Fig. 7, in which a layer of glass fiber 10 is combined with a layer of granulated sponge rubber 16 by an adhesive 30, the resilience of the sponge rubber being modified by the soft and resilient layer of glass fiber. In producing a loose cushion for use with upholstered furniture, layers of glass fiber may be bonded to opposite sides of a layer of tuflex and over and entirely enclosing these layers cut to size is an outer casing 40 of sponge rubber in which the resilient and fibrous layers are preferably under slight compression so that they tend to fill the sponge rubber casing 40 and causing it to spread or bulge slightly outward. Over the sponge rubber casing, a cover 42 of fabric or other suitable material is placed, the filling and the sponge rubber casing preferably filling the cover 42 tightly so that it may be depressed yieldingly and pleasingly against the sponge rubber and the resilient glass fiber at both sides thereof, thus producing a cushion of highly desirable qualities, as shown in Fig. 8.

The above combinations of materials are for illustrative purposes as the system of combining layers of resilient and flexible materials into cut forms and bonding the laminations of the forms together may be applied to other materials as well as those named herein. The combination of the glass fiber with the cotton fiber or tuflex, produces a highly desirable filler which has a cumulative flexible and resilient effect wherever used and both of these layers may be readily bonded to other layers of fiber, sponge rubber, foam and other layers for producing slightly different and variable results.

While this system of combining layers of materials and bonding them together to form flexible resilient fillers have been described in some detail, they should be regarded as illustrations or examples rather than as limitations or restrictions of the invention, since various changes in the construction, combination, and arrangement of the parts may be made without departing from the spirit and scope of the invention.

I claim:

The combination with a laminated filler comprising resilient layers of glass fiber, tufted cotton and sponge rubber, of an adhesive binding the adjacent layers together, the layers all being cut normally to the outer surface thereof to provide shaped units, a sponge rubber casing enclosing each of said units and sealed with the unit therein, and an enclosing fabric cover for the said rubber casing.

References Cited in the file of this patent

UNITED STATES PATENTS

| 2,121,678 | Armor | June 21, 1938 |
| 2,255,554 | Gordon | Sept. 9, 1941 |
| 2,298,986 | Taylor et al. | Oct. 13, 1942 |
| 2,586,275 | Toulmin | Feb. 19, 1952 |
| 2,626,886 | Scholl | Jan. 27, 1953 |

FOREIGN PATENTS

| 389,487 | Great Britain | Mar. 15, 1933 |